(12) United States Patent
Uchino et al.

(10) Patent No.: US 10,531,340 B2
(45) Date of Patent: Jan. 7, 2020

(54) USER EQUIPMENT, BASE STATION AND METHOD

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP); Yuta Sagae, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 149 days.

(21) Appl. No.: 14/765,901

(22) PCT Filed: Jan. 21, 2014

(86) PCT No.: PCT/JP2014/051107
§ 371 (c)(1),
(2) Date: Aug. 5, 2015

(87) PCT Pub. No.: WO2014/125880
PCT Pub. Date: Aug. 21, 2014

(65) Prior Publication Data
US 2015/0373586 A1 Dec. 24, 2015

(30) Foreign Application Priority Data
Feb. 18, 2013 (JP) ................. 2013-029460

(51) Int. Cl.
*H04W 28/16* (2009.01)
*H04W 76/34* (2018.01)
(Continued)

(52) U.S. Cl.
CPC .......... *H04W 28/16* (2013.01); *H04W 72/04* (2013.01); *H04W 76/15* (2018.02); *H04W 76/34* (2018.02); *H04W 88/02* (2013.01); *H04W 88/08* (2013.01)

(58) Field of Classification Search
CPC ..... H04W 16/26; H04W 28/16; H04W 36/00; H04W 36/0072; H04W 72/04; H04W 76/02; H04W 76/06; H04L 1/188
See application file for complete search history.

(56) References Cited

U.S. PATENT DOCUMENTS 8,432,808 B1 * 4/2013 Dankberg ............. H04L 67/325
370/235
8,964,688 B2 * 2/2015 Kim ...................... H04L 1/1896
370/330
(Continued)

FOREIGN PATENT DOCUMENTS

CN 102056318 A 5/2011
EP 2696617 A1 2/2014
(Continued)

OTHER PUBLICATIONS

Office Action dated Dec. 5, 2016, in corresponding European Patent Application No. 14752086.0 (5 pages).
(Continued)

*Primary Examiner* — Andrew Lai
*Assistant Examiner* — Andrew C Lee
(74) *Attorney, Agent, or Firm* — Osha Liang LLP

(57) ABSTRACT

Some techniques for promptly assigning uplink dedicated resources in inter-site or inter-eNB carrier aggregation are disclosed. One aspect of the present invention relates to a user equipment including a transmission and reception unit configured to use radio resources to communicate with multiple base stations, a resource management unit configured to manage the radio resources and a cell type determination unit configured to determine a type of a cell providing the radio resources, wherein when the resource management unit detects occurrence of a release trigger for assigned uplink dedicated resources, the cell type determination unit determines a type of a cell providing the uplink dedicated
(Continued)

resources and retains or releases the uplink dedicated resources depending on the determined cell type.

5 Claims, 7 Drawing Sheets

(51) Int. Cl.
*H04W 76/15* (2018.01)
*H04W 72/04* (2009.01)
*H04W 88/02* (2009.01)
*H04W 88/08* (2009.01)

(56) References Cited

U.S. PATENT DOCUMENTS

| | | | | |
|---|---|---|---|---|
| 2004/0224709 | A1* | 11/2004 | Yi | H04W 76/18 455/515 |
| 2004/0229626 | A1* | 11/2004 | Yi | H04W 76/10 455/450 |
| 2010/0070816 | A1* | 3/2010 | Park | H04L 1/1835 714/748 |
| 2010/0091726 | A1* | 4/2010 | Ishii | H04L 1/18 370/329 |
| 2011/0117948 | A1* | 5/2011 | Ishii | H04L 5/0007 455/509 |
| 2012/0039285 | A1* | 2/2012 | Seo | H04L 1/1671 370/329 |
| 2012/0100864 | A1* | 4/2012 | Susitaival | H04L 1/188 455/450 |
| 2012/0294204 | A1* | 11/2012 | Chen | H04L 1/1812 370/280 |
| 2014/0036822 | A1 | 2/2014 | Maeda et al. | |
| 2014/0192775 | A1* | 7/2014 | Li | H04W 36/0072 370/331 |
| 2015/0036608 | A1* | 2/2015 | Morita | H04L 1/1887 370/329 |
| 2015/0056992 | A1* | 2/2015 | Morita | H04W 72/0426 455/435.1 |

FOREIGN PATENT DOCUMENTS

| | | |
|---|---|---|
| WO | 2011/100673 A1 | 8/2011 |
| WO | 2012/137619 A1 | 10/2012 |

OTHER PUBLICATIONS

Extended European Search Report issued in corresponding European Application No. 14752086.0, dated Mar. 16, 2016 (6 pages).
International Search Report issued in corresponding application No. PCT/JP2014/051107 dated Feb. 25, 2014 (2 pages).
Written Opinion issued in corresponding application No. PCT/JP2014/051107 dated Feb. 25, 2014 (3 pages).
3GPP TS 36.321 V11.1.0; "3rd Generation Partnership Project; Technical Specification Group Radio Access Network; Evolved Universal Terrestrial Radio Access (E-UTRA); Medium Access Control (MAC) protocol specification (Release 11)"; Dec. 2012 (57 pages).
NTT Docomo, Inc.; "Deployment scenarios and design goals for dual connectivity"; 3GPP TSG-RAN WG2 #81, R2-130444; St. Julian's, Malta; Jan. 28-Feb. 1, 2013 (6 pages).
Panasonic; "type-0 SRS resources after Scell TA timer expiry"; 3GPP TSG-RAN WG2 Meeting #76, R2-115883; San Francisco, USA; Nov. 14-18, 2011 (2 pages).
Office Action issued in corresponding Japanese application No. 2013-029460, dated Feb. 7, 2017 (5 pages).
Office Action issued in corresponding Chinese Patent Application No. 201480008873.5, dated Jan. 23, 2018 (15 pages).

* cited by examiner

USER EQUIPMENT, BASE STATION AND METHOD

TECHNICAL FIELD

The present invention generally relates to radio communication techniques and more particularly relates to radio communications using carrier aggregation.

BACKGROUND ART

Presently, as a next-generation communication standard of LTE (Long Term Evolution), 3GPP (3rd Generation Partnership Project) is promoting standardization of LTE-Advanced. In a LTE-Advanced system, a carrier aggregation (CA) technique is introduced to achieve a higher throughput than a LTE system while ensuring backward compatibility with the LTE system. In the carrier aggregation technique, a LTE carrier (also referred to as a component carrier) having the maximum bandwidth of 20 MHz supported by the LTE system is utilized as a basic component, and it is designed to implement communications in a wider band by employing such multiple component carriers simultaneously.

In the LTE-Advanced, small cell enhancement, where a mixture of a macro cell provided by a conventional base station and a small cell covering a smaller geographical area is used, is proposed. Typically, the small cell is disposed in a traffic intensive area such as a hot spot and an indoor area which is difficult for the macro cell to cover and is used to improve communication in these areas.

In a network architecture using the small cell enhancement, utilization of inter-site CA or inter-eNB CA, where a user equipment (UE) communicates using a macro base station (macro-eNB) serving a macro cell and a small base station (small-eNB) serving a small cell simultaneously, is discussed. In typical inter-site or inter-eNB CA, the macro base station serves as an anchor base station and manages the small base station serving as a non-anchor base station to implement the inter-site or inter-eNB CA with the user equipment.

FIG. 1 is a schematic view of the inter-site CA in the small cell enhancement. As is shown in FIG. 1, in the inter-site or inter-eNB carrier aggregation in the small cell enhancement, for example, reliability required control signals or C-plane data (Signaling Radio Bearer: SRB) are communicated by a macro base station serving as an anchor base station to a user equipment via a macro cell, and wideband communication required data signals or U-plane data (Data Radio Bearer: DRB) are communicated by a small base station serving as a non-anchor base station to the user equipment via a small cell.

Meanwhile, it is specified in the LTE system and the LTE-Advanced system that a base station assigns an uplink dedicated resource to a user equipment and uses the assigned uplink dedicated resource to obtain various information such as request information and feedback information from the user equipment. Examples of the uplink dedicated resources include a scheduling request, a PUCCH-CQI (Physical Uplink Control Channel-Channel Quality Indicator) and a SRS (Sounding Reference Signal).

The scheduling request is a resource for requesting a base station for an uplink grant (UL grant) to allow for data transmission when uplink data for transmission arise in the user equipment. The PUCCH-CQI is a resource for feeding downlink communication quality information back to the base station. The SRS is a resource for causing a base station to measure uplink communication quality information.

The uplink dedicated resources are assigned to a user equipment by a RRC (Radio Resource Control) layer signal. It is specified that upon occurrence of a predefined release trigger, the assigned uplink dedicated resources are autonomously released by a user equipment. For example, the release trigger of uplink dedicated resources may include a release command by a RRC layer signal, expiration of a TA (Time Alignment) timer, over-retransmission of the scheduling request and execution of a retransmission procedure.

It is specified that in the case where the inter-site or inter-eNB carrier aggregation is configured, a single base station (anchor base station) basically transmits and receives RRC signaling. If multiple base stations transmit and receive the RRC signaling, bearers for C-plane data or a SRB must be set between the user equipment and the respective base stations, which is not desirable from the viewpoint of network complexity.

Meanwhile, it is assumed that resources in a cell served by each base station are basically managed by that base station. This is because it is not practical that a macro base station or an anchor base station manages resources of all connected small base stations.

Thus, when an uplink dedicated resource in a cell served by a small base station is reassigned to a user equipment (for example, at restarting uplink data), a reassignment procedure of uplink dedicated resources as set forth will be performed among the user equipment, the macro base station and the small base station.

Specifically, it is assumed that after an earlier configured or assigned uplink dedicated resource in a small cell has been released, the uplink dedicated resource in the small cell must be reassigned to the user equipment due to some reasons. As is shown in FIG. 2, at step S1, a macro base station managing the small base station serving the small cell sends the small base station a resource assignment request for assigning the uplink dedicated resource to the user equipment.

Upon receiving the resource assignment request, at step S2, the small base station assigns the uplink dedicated resource to the user equipment and sends the macro base station a resource assignment response indicative of the assigned uplink dedicated resource.

Upon receiving the resource assignment response, at step S3, the macro base station sends the user equipment a RRC Connection Reconfiguration.

Upon receiving the RRC Connection Reconfiguration, at step S4, the user equipment performs a RRC connection reconfiguration operation based on the indicated uplink dedicated resource in the small base station and sends the macro base station a RRC Connection Reconfiguration Complete after completion of the operation.

Upon receiving the RRC Connection Reconfiguration Complete, at step S5, the macro base station sends the small base station an assignment completion indication. Then, radio communication is established between the user equipment and the small base station, and the user equipment can use the assigned uplink dedicated resource.

See 3GPP TS 36.321 V11.1.0 (2012-12) for further details, for example.

SUMMARY OF INVENTION

Problem to be Solved by the Invention

If the assigned uplink dedicated resource has been released in response to the above-stated release trigger and subsequently the uplink dedicated resource in the small cell must be reassigned to the user equipment, the above-stated random access procedure must be executed again, which would cause transmission and reception delay of user data or U-plane between the small base station and the user equipment.

Specifically, if a scheduling request has not been assigned, the user equipment must always perform the above-stated random access procedure to request the small base station for an uplink grant, which would cause transmission delay of uplink data. Also, if a periodic CQI has not been assigned, the small base station cannot know downlink communication quality for the small cell and accordingly cannot perform optimal link adaptation. In this case, the small cell would select any suitable MCS (Modulation and Coding Scheme) or a MCS estimated to be the most reliable. In addition, if a periodic SRS has not been assigned, the small base station cannot know uplink communication quality for the small cell and accordingly cannot perform optimal link adaptation.

In light of the above-stated problems, one objective of the present invention is to provide some techniques for assigning uplink dedicated resources promptly in the inter-site or inter-eNB carrier aggregation.

Means for Solving the Problem

In light of the above-stated problems, one aspect of the present invention relates to a user equipment comprising: a transmission and reception unit configured to use radio resources to communicate with multiple base stations; a resource management unit configured to manage the radio resources; and a cell type determination unit configured to determine a type of a cell providing the radio resources, wherein when the resource management unit detects occurrence of a release trigger for assigned uplink dedicated resources, the cell type determination unit determines a type of a cell providing the uplink dedicated resources and retains or releases the uplink dedicated resources depending on the determined cell type.

Another aspect of the present invention relates to a base station comprising: a transmission and reception unit configured to use radio resources to communicate with a user equipment; and a resource management unit configured to manage the radio resources, wherein when the resource management unit configures uplink dedicated resources for the user equipment in response to an indication from an anchor base station in inter-eNB carrier aggregation, the resource management unit sends the anchor base station configuration information indicative of the configured uplink dedicated resources and reserves the configured uplink dedicated resources for communication with the user equipment without assigning to other user equipments.

Another aspect of the present invention relates to a base station, comprising: a transmission and reception unit configured to use radio resources to communicate with a user equipment; a configuration information storage unit configured to store configuration information indicative of uplink dedicated resources configured for the user equipment by a non-anchor base station in inter-eNB carrier aggregation; and a resource management unit configured to manage the radio resources, wherein when the resource management unit reassigns uplink dedicated resources to the user equipment, the resource management unit autonomously assigns the uplink dedicated resources indicated in the configuration information to the user equipment without sending a reassignment request to the non-anchor base station.

Advantage of the Invention

According to the present invention, it is possible to assign uplink dedicated resources promptly in the inter-site or inter-eNB carrier aggregation.

EMBODIMENTS OF THE INVENTION

Embodiments of the present invention are described below with reference to the drawings.

Briefly overviewing embodiments of the present invention as described below, when a macro base station initially configures a small cell for a user equipment, the user equipment retains an assigned uplink dedicated resource in the small cell without releasing it autonomously even in occurrence of a release trigger for the uplink dedicated resource.

Figure 1:
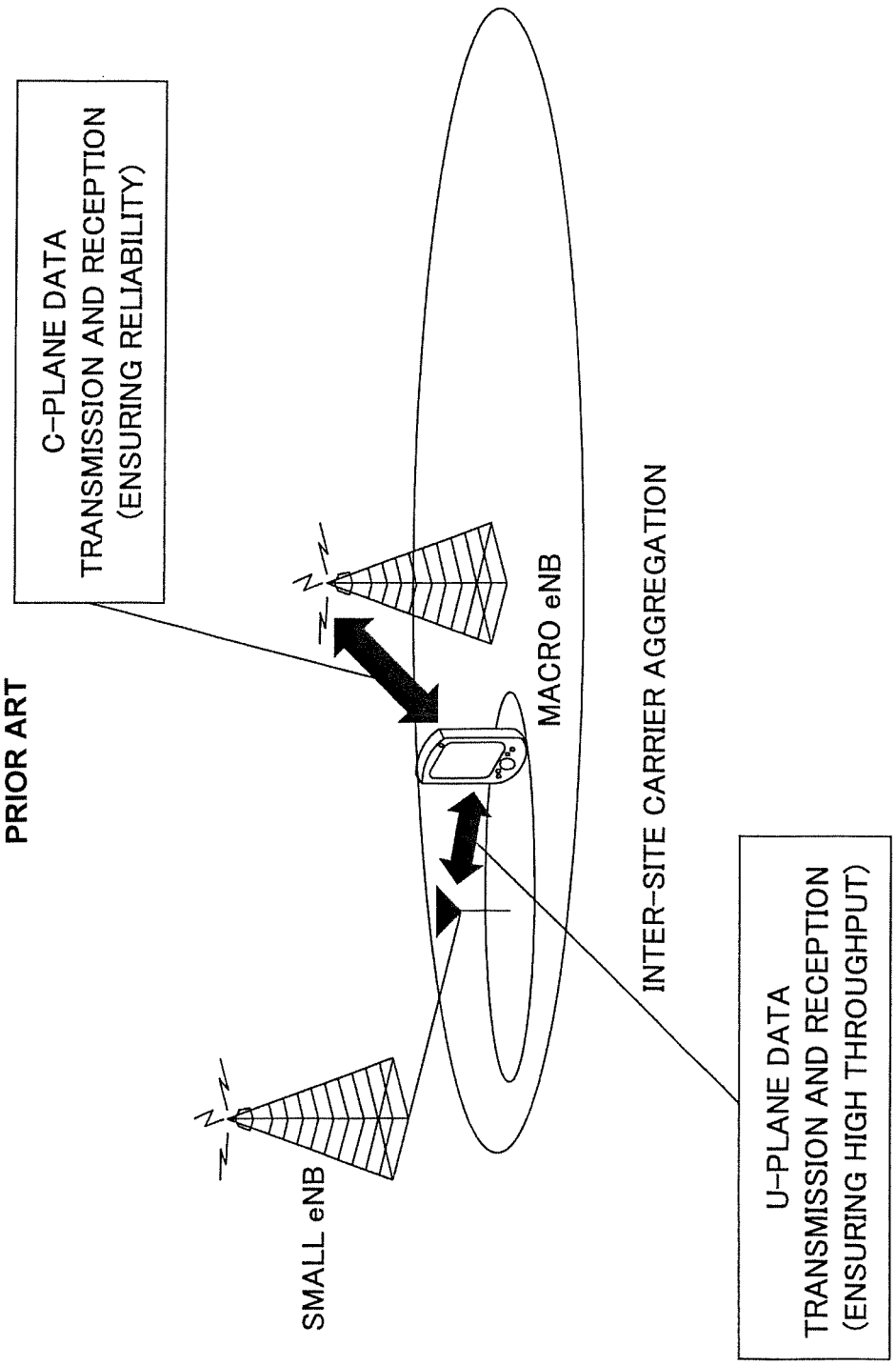
FIG. 1 is a schematic view of inter-site carrier aggregation in small cell enhancement.
Figure 2:
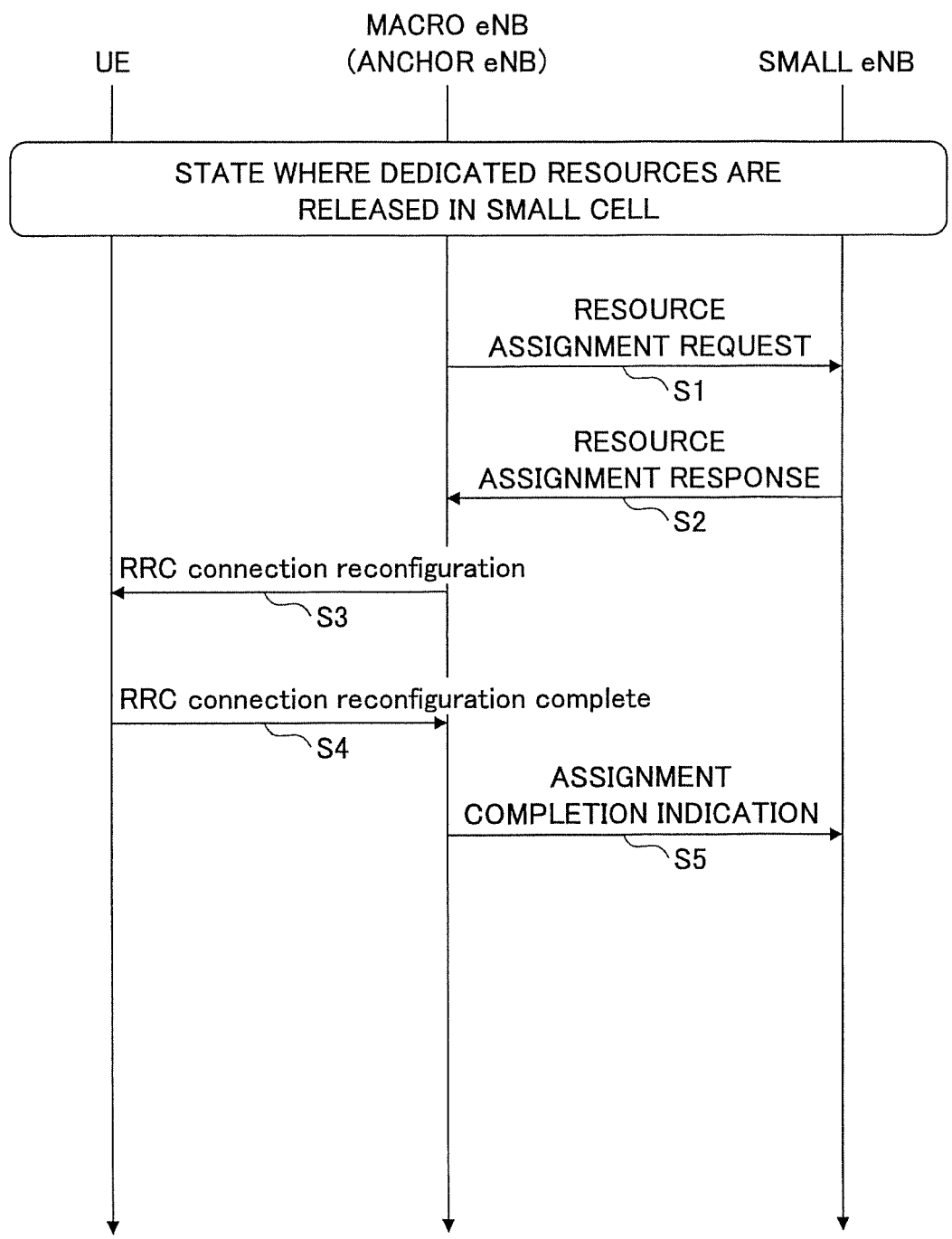
FIG. 2 is a sequence diagram for illustrating an uplink dedicated resource reconfiguration operation.
Figure 3:
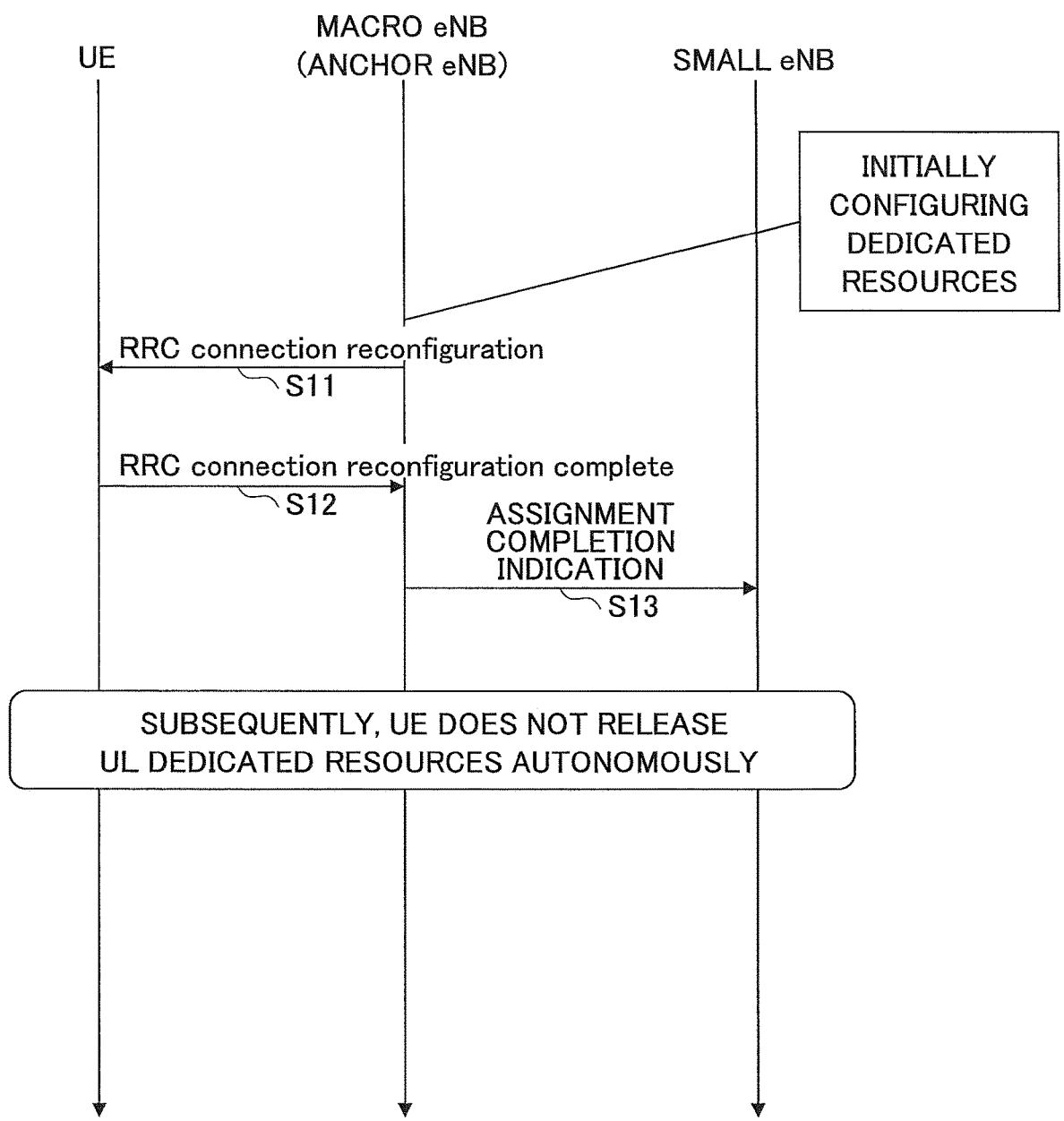
FIG. 3 is a sequence diagram for illustrating an uplink dedicated resource configuration operation according to one embodiment of the present invention.

Specifically, as illustrated in FIG. 3, at step S11, when a macro base station transmits a RRC Connection Reconfiguration to configure a small cell for a user equipment in order to start inter-site or inter-eNB carrier aggregation (referred to as inter-eNB carrier aggregation hereinafter), the user equipment performs a RRC connection reconfiguration operation based on an uplink dedicated resource in the small cell assigned at this configuration time. Upon completion of the reconfiguration operation, at step S12, the user equipment sends the macro base station a RRC Connection Reconfiguration Complete. Upon receiving the RRC Connection Reconfiguration Complete, at step S13, the macro base station may send the small base station an assignment completion indication. In the case where the uplink dedicated resource in the small cell is assigned to the user equipment in accordance with the above procedure, even upon subsequent occurrence of a release trigger for the uplink dedicated resource, the user equipment retains the assigned uplink dedicated resource in the small cell without releasing it autonomously. As a result, when an uplink dedicated resource in the small cell must be assigned to the user equipment after the occurrence of the release trigger, the user equipment can communicate with the small base station using the retained uplink dedicated resource in the small cell without performing a random access procedure for reconfiguration as illustrated in FIG. 2.

Figure 4:
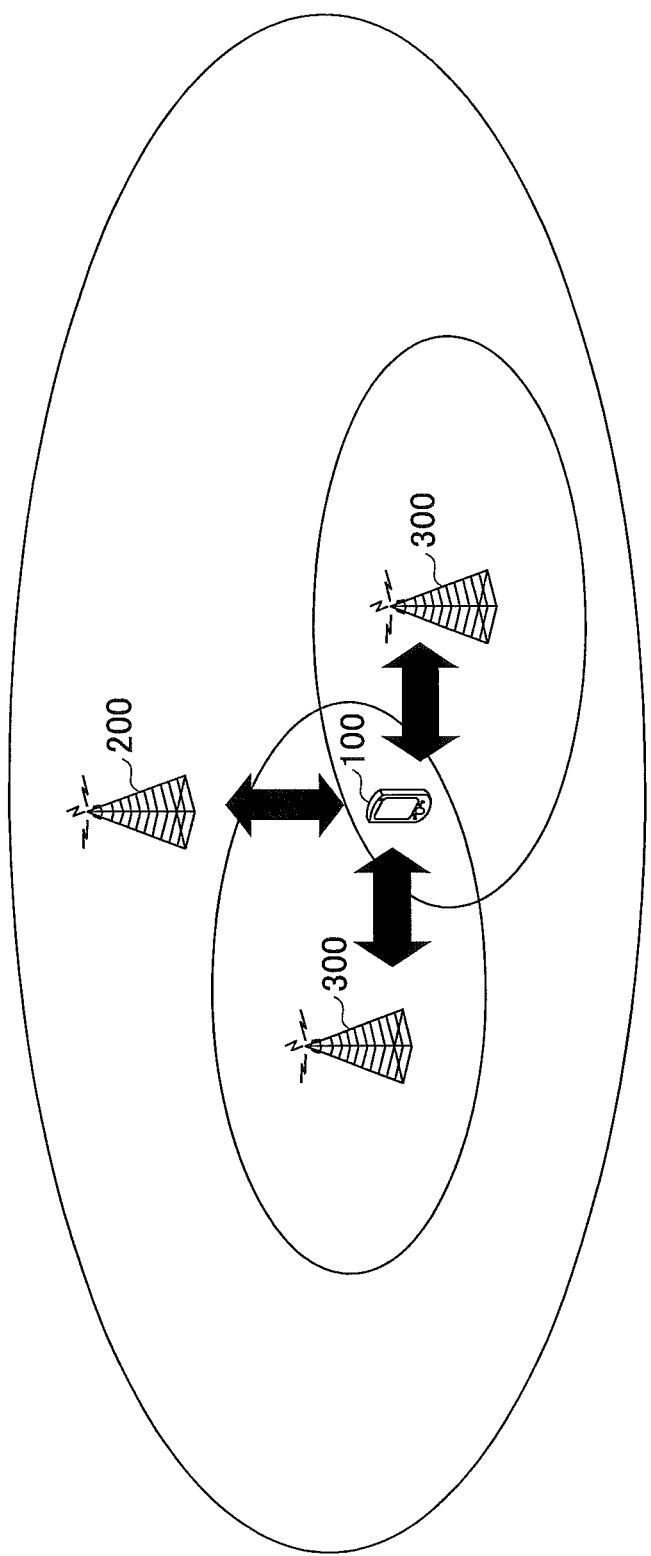
FIG. 4 is a schematic view of a radio communication system according to one embodiment of the present invention.

At the outset, a radio communication system according to one embodiment of the present invention is described with reference to FIG. 4. FIG. 4 is a schematic view of a radio communication system according to one embodiment of the present invention.

As is shown in FIG. 4, a radio communication system 10 is a radio communication system that supports radio communication using inter-eNB carrier aggregation such as a LTE-Advanced system. The radio communication system 10 has a user equipment 100, a macro base station 200 and a small base station 300.

The user equipment 100 is any information processing device having a radio communication function such as a mobile phone, a smartphone, a tablet and a mobile router. Also, the user equipment 100 supports the inter-eNB carrier aggregation for communication using a macro cell served by the macro base station 200 and a small cell served by the small base station 300 simultaneously.

The macro base station 200 wirelessly connects to the user equipment 100 to send the user equipment 100 downlink (DL) data received from a communicatively connected upper station or server (not shown) as well as to send the upper station (not shown) uplink (UL) data received from the user equipment 100. Also, the macro base station 200 serves as an anchor base station in the inter-eNB carrier aggregation and configures a small cell served by the controlled small base station for the user equipment 100. In the case where the inter-eNB carrier aggregation is applied, for example, the macro base station 200 mainly exchanges control signals or C-plane data with the user equipment 100 so as to ensure reliable radio connection to the user equipment 100. Here, the anchor base station may be a base station managing RRC, a base station whose interface with a CN (Core Network) has been established, or a base station managing a primary cell (PCell) in CA.

The small base station 300 serves as a non-anchor base station controlled by the macro base station 200 and in response to reception of a resource assignment request for requesting to assign radio resources to the user equipment 100 from the macro base station 200, configures radio resources in a small cell for the user equipment 100. The user equipment 100 uses the configured radio resources to communicate with the small base station 300. In the case where the inter-eNB carrier aggregation is applied, for example, the small base station 300 mainly exchanges data signals or U-plane data with the user equipment 100 so as to ensure high throughput communication with the user equipment 100.

Figure 5:
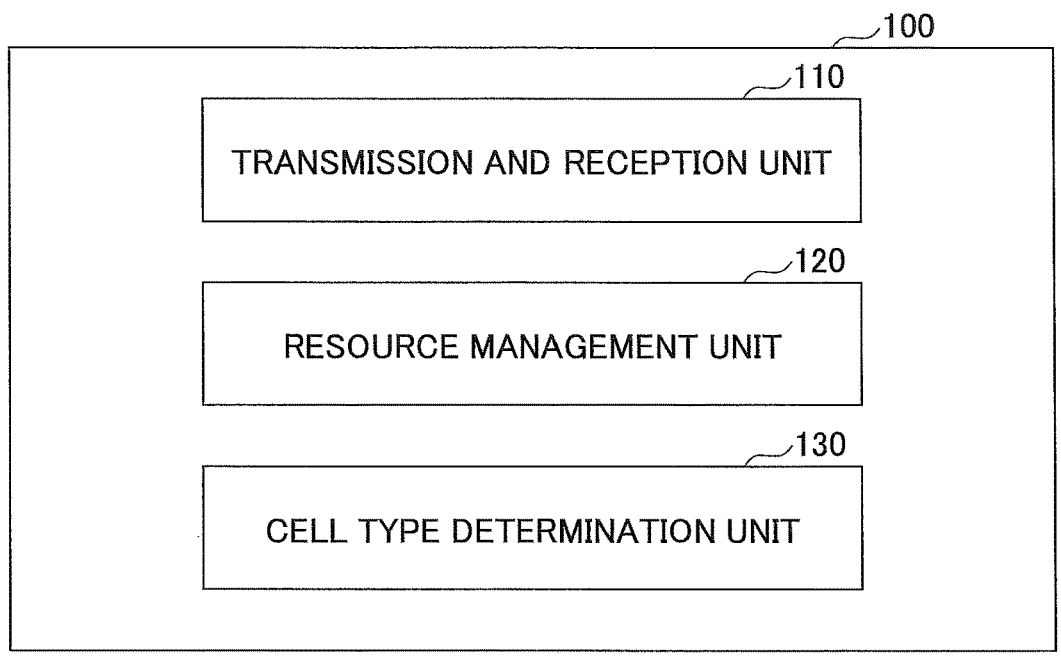
FIG. 5 is a block diagram for illustrating an arrangement of a user equipment according to one embodiment of the present invention.

Next, an arrangement of a user equipment according to one embodiment of the present invention is described with reference to FIG. 5. FIG. 5 is a block diagram for illustrating an arrangement of a user equipment according to one embodiment of the present invention.

As is shown in FIG. 5, the user equipment 100 has a transmission and reception unit 110, a resource management unit 120 and a cell type determination unit 130.

The transmission and reception unit 110 uses radio resources to communicate with the macro base station 200 and the small base station 300. When inter-site or inter-eNB carrier aggregation is applied to the user equipment 100, the transmission and reception unit 110 uses radio resources assigned by the macro base station 200 and radio resources assigned by the small base station 300 under control by the macro base station 200 simultaneously to exchange various signals and channels with the macro base station 200 and the small base station 300.

The resource management unit 120 manages radio resources for use in communication with the macro base station 200 and the small base station 300. When radio resources are assigned by the macro base station 200 and the small base station 300, the resource management unit 120 instructs the transmission and reception unit 110 to use the assigned radio resources to transmit various signals and channels. Also, upon occurrence of a predefined release trigger at the user equipment 100, the resource management unit 120 releases the assigned radio resources autonomously.

For example, the release trigger for causing the user equipment 100 to autonomously release uplink dedicated resources such as a scheduling request, a PUCCH-CQI and a SRS may include a release command by a RRC layer signal, expiration of a TA (Time Alignment) timer, over-retransmission of the scheduling request and execution of a retransmission procedure. Upon occurrence of any of these release triggers, the resource management unit 120 releases the uplink dedicated resources autonomously. The resource management unit 120 detects whether the release trigger has occurred.

The cell type determination unit 130 determines a type of a cell providing radio resources. Specifically, the cell type determination unit 130 determines whether radio resources assigned to the user equipment 100 are provided from a macro cell or a small cell. This determination can be implemented by asking the resource management unit 120 managing the radio resources for use in communication with the macro base station 200 and the small base station 300 whether the targeted radio resources are provided from the macro cell or the small cell.

Upon detecting the occurrence of a release trigger of the assigned uplink dedicated resources, the resource management unit 120 causes the cell type determination unit 130 to determine the type of the cell providing the uplink dedicated resources without releasing the uplink dedicated resources immediately. Upon receiving an indication of detecting the occurrence of the release trigger from the resource management unit 120, the cell type determination unit 130 determines whether the cell providing the uplink dedicated resources is the macro cell or the small cell.

If the cell type determination unit 130 determines that the uplink dedicated resources targeted for the detected release trigger are from the macro cell served by the macro base station 200 acting as an anchor base station in the inter-eNB carrier aggregation, the resource management unit 120 releases the uplink dedicated resources autonomously. On the other hand, if the cell type determination unit 130 determines that the uplink dedicated resources are from the small cell served by the small base station 300 acting as a non-anchor base station in the inter-eNB carrier aggregation, the resource management unit 120 suspends releasing the uplink dedicated resources autonomously and retains the uplink dedicated resources.

If the uplink dedicated resources targeted for the detected release trigger are retained, the transmission and reception unit 110 may stop uplink transmission in the small cell providing the uplink dedicated resources. For example, the user equipment 100 may suspend the uplink transmission, that is, stop the uplink transmission by setting a new state. Also, the user equipment 100 may stop the uplink transmission by deactivation of the small cell. Also, the user equipment 100 may stop the uplink transmission by stopping a TA timer. If the uplink transmission is stopped, this event may be indicated to the anchor base station (may further be indicated from the anchor base station to the small base station).

According to the above embodiment, the user equipment 100 autonomously determines to retain or release the uplink dedicated resources depending on the cell type of a cell providing the uplink dedicated resources targeted for the detected release trigger, but the present invention is not limited to it. In other embodiments, the user equipment 100 may not release the uplink dedicated resources autonomously but may release the uplink dedicated resources in response to a release command from the macro base station 200 or the small base station 300.

Figure 6:
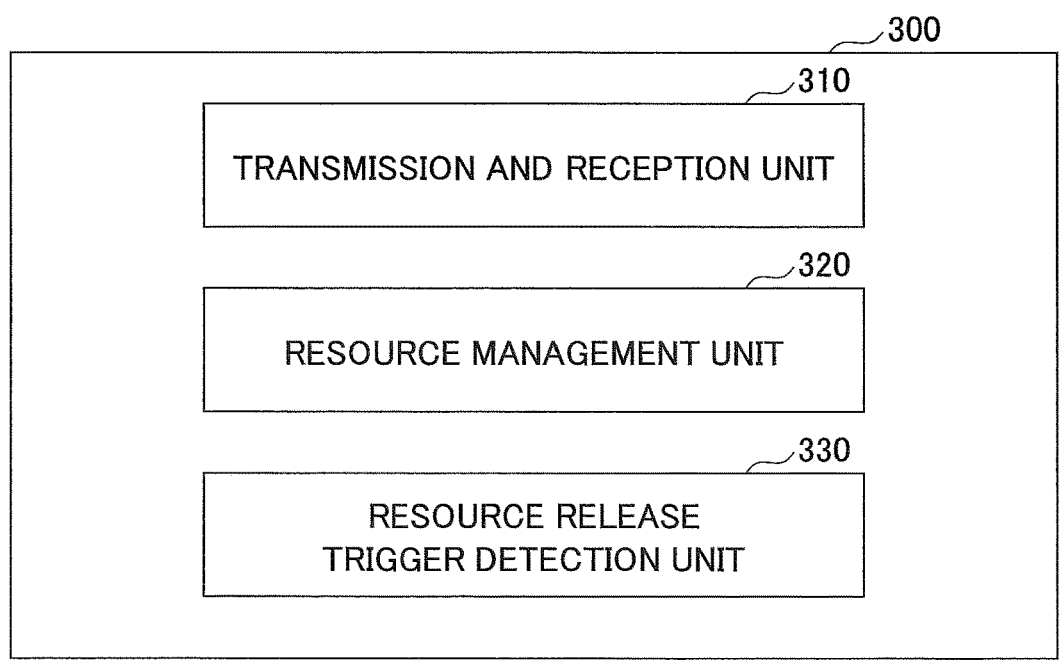
FIG. 6 is a block diagram for illustrating an arrangement of a small base station according to one embodiment of the present invention.

Next, an arrangement of a small base station according to one embodiment of the present invention is described with reference to FIG. 6. The small base station 300 serves as a non-anchor base station under control by the macro base station 200 serving as an anchor base station. FIG. 6 is a block diagram for illustrating an arrangement of a small base station according to one embodiment of the present invention.

As is shown in FIG. 6, the small base station 300 has a transmission and reception unit 310, a resource management unit 320 and a resource release trigger detection unit 330.

The transmission and reception unit 310 uses radio resources to communicate with the user equipment 100. When inter-eNB carrier aggregation is applied to the user equipment 100, the transmission and reception unit 310 uses radio resources assigned to the user equipment 100 to exchange various signals and channels with the user equipment 100.

The resource management unit 320 manages radio resources for use in communication with the user equipment 100. Upon receiving a resource assignment request to initiate communication with the user equipment 100 in accordance with the inter-eNB carrier aggregation from the macro base station 200 serving as an anchor base station, the resource management unit 320 assigns unassigned radio resources to the user equipment 100 and sends the macro base station 200 a resource assignment response including configuration information indicative of the assigned radio resources.

When configuring uplink dedicated resources for the user equipment 100 in response to the resource assignment request for the user equipment 100 from the macro base station 200, the resource management unit 320 sends the macro base station 200 the configuration information indicative of the configured uplink dedicated resources. Also, the resource management unit 320 reserves the configured uplink dedicated resources for communication with the user equipment 100 until occurrence of a predefined release trigger at the small base station 300 without assigning to other user equipments.

As illustrated, the small base station 300 has a resource release trigger detection unit 330 to detect occurrence of a predefined release trigger. When the resource release trigger detection unit 330 detects that the predefined release trigger has occurred, the resource management unit 320 releases the uplink dedicated resource reserved for the user equipment 100. The release trigger at the small base station 300 may include detecting that the user equipment 100 has gone away from a small cell served by the small base station 300, receiving a release request for the uplink dedicated resources assigned to the user equipment 100 from the macro base station 200, or detecting that a utilization rate of radio resources managed by the resource management unit 320 has been higher than or equal to a predefined threshold or that the assigned resources have not been utilized for a predefined period. As a result, it is possible to avoid unnecessary reservation of radio resources for the user equipment 100.

Figure 7:
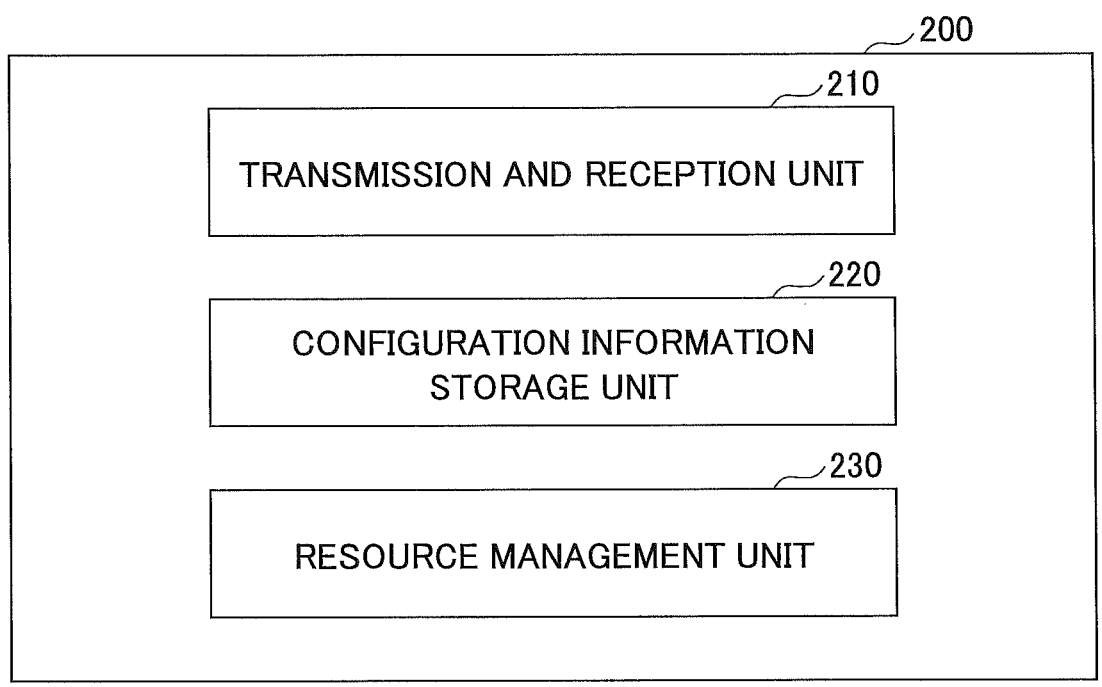
FIG. 7 is a block diagram for illustrating an arrangement of a macro base station according to one embodiment of the present invention.

Next, an arrangement of a macro base station according to one embodiment of the present invention is described with reference to FIG. 7. The macro base station 200 serves as an anchor base station in inter-eNB carrier aggregation and manages the small base station 300 under its control. FIG. 7 is a block diagram for illustrating an arrangement of a macro base station according to one embodiment of the present invention.

As is shown in FIG. 7, the macro base station 200 has a transmission and reception unit 210, a configuration information storage unit 220 and a resource management unit 230.

The transmission and reception unit 210 uses radio resources to communicate with the user equipment 100. The transmission and reception unit 210 exchanges various channels and signals with the user equipment 100.

The configuration information storage unit 220 stores configuration information provided from the small base station 300 at newly configuring a small cell of the small base station 300 for the user equipment 100. As stated above, the configuration information indicates radio resources that in response to a resource assignment request from the macro base station 200, the small base station 300 has reserved for the user equipment 100. In other words, the small base station 300 uses the reserved uplink dedicated resources for only the user equipment 100 without assigning to other equipments until occurrence of a release trigger at the small base station 300 as stated above.

The resource management unit 230 manages radio resources for use in communication with the user equipment 100. Also, when reconfiguring uplink dedicated resources in a small cell for the user equipment 100, the resource management unit 230 assigns uplink dedicated resources indicated in configuration information to the user equipment 100 without sending a reconfiguration request to the small base station 300. Specifically, after the uplink dedicated resources in the small cell of the small base station 300 have been released for the user equipment 100, upon determining that the uplink dedicated resources in the small cell have to be reconfigured for the user equipment 100, the macro base station 200 indicates the uplink dedicated resources specified in the configuration information to the user equipment 100 without requesting the small base station 300 to assign new uplink dedicated resources. The user equipment 100 uses the uplink dedicated resources indicated from the macro base station 200 to communicate with the small base station 300.

Figure 8:
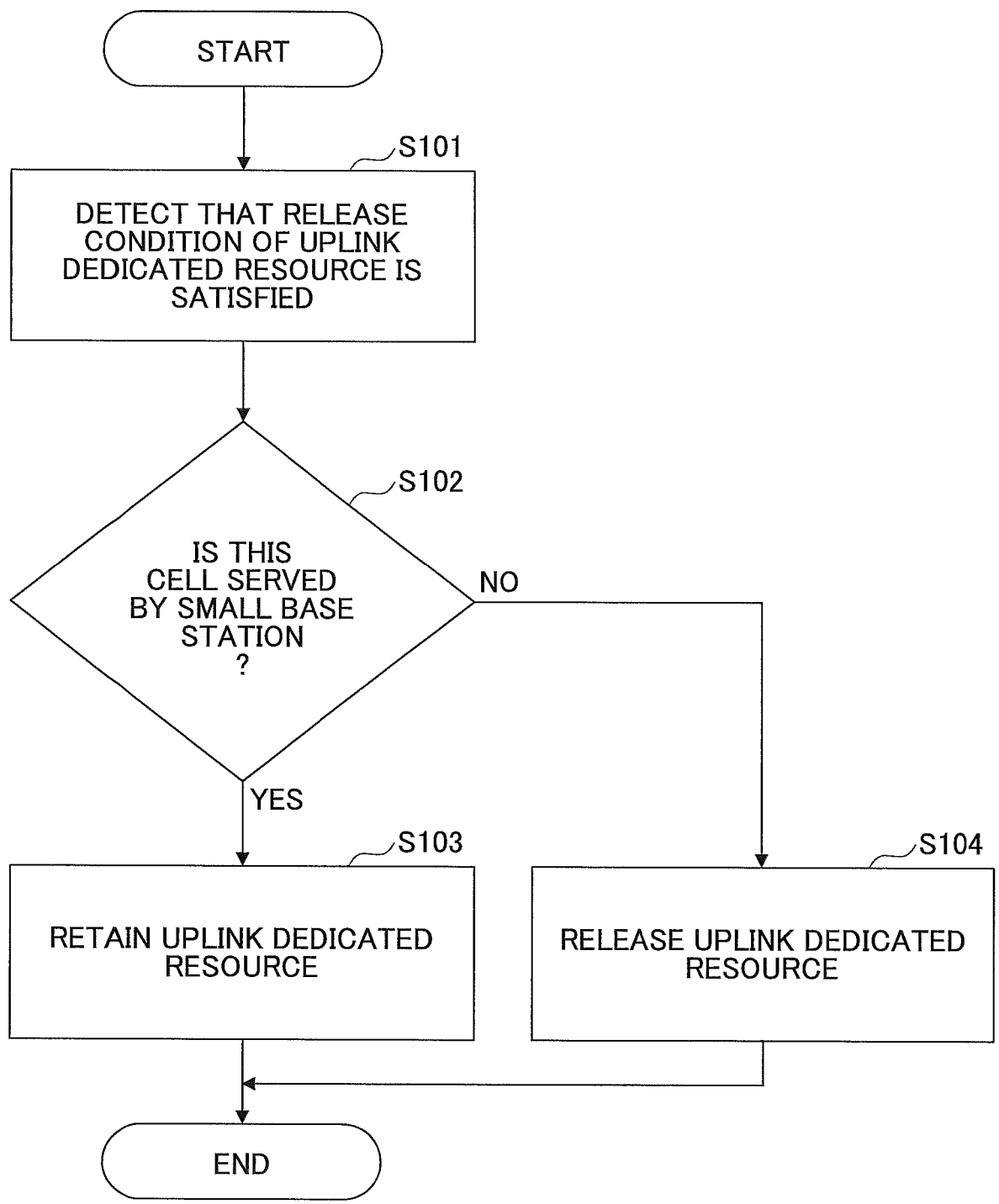
FIG. 8 is a flowchart for illustrating an uplink dedicated resource management operation in a user equipment according to one embodiment of the present invention.

Next, an uplink dedicated resource management operation in a user equipment according to one embodiment of the present invention is described with reference to FIG. 8. FIG. 8 is a flowchart illustrating an uplink dedicated resource management operation in a user equipment according to one embodiment of the present invention. For example, when the small base station 300 initially configures uplink dedicated resources in a small cell for the user equipment 100 in response to a resource assignment request to start inter-eNB carrier aggregation from the macro base station 200, the operation starts.

As is shown in FIG. 8, at step S101, the user equipment 100 detects that a predefined release trigger has occurred at the user equipment 100 for uplink dedicated resources assigned by the macro base station 200 or the small base station 300. For example, the release trigger may be any of a release command by a RRC layer signal, expiration of a TA timer, over-retransmission of a scheduling request and execution of a retransmission procedure.

At step S102, the user equipment 100 determines whether a cell for the uplink dedicated resources targeted for the detected release trigger is a small cell served by the small base station 300 or a macro cell served by the macro base station 200.

If the uplink dedicated resources are provided from the small cell (S102: Y), the user equipment 100 retains the uplink dedicated resources without releasing. In this case, the user equipment 100 may stop uplink transmission. If the uplink transmission is stopped, the user equipment 100 may indicate this event to the macro base station 200 (may further indicate from the macro base station 200 to the small base station 300). On the other hand, if the uplink dedicated resources are provided from the macro cell (S102: N), the user equipment 100 releases the uplink dedicated resources.

Although the embodiments of the present invention have been described above, the present invention is not limited to the above-stated specific embodiments, and various modifications and variations can be made within the spirit of the present invention as recited in claims.

This international patent application is based on Japanese Priority Application No. 2013-029460 filed on Feb. 18, 2013, the entire contents of which are hereby incorporated by reference.

LIST OF REFERENCE SYMBOLS

10: radio communication system
100: user equipment
110: transmission and reception unit
120: resource management unit
130: cell type determination unit
200: macro base station
210: transmission and reception unit
220: configuration information storage unit
230: resource management unit
300: small base station
310: transmission and reception unit
320: resource management unit
330: resource release trigger detection unit

The invention claimed is:

1. A user equipment comprising:
a transmission and reception unit, wherein radio resources are assigned from multiple base stations to the transmission and reception unit;
a resource management unit configured to manage the radio resources; and
a cell type determination unit configured to determine a type of a cell providing the radio resources,
wherein when the resource management unit detects occurrence of a release trigger for assigned uplink dedicated radio resources, the cell type determination unit determines a type of a cell providing the uplink dedicated radio resources, and the resource management unit retains or releases the uplink dedicated radio resources depending on the determined cell type, and
wherein the release trigger for the uplink dedicated radio resources is an excess of retransmissions of a scheduling request for requesting an uplink grant of uplink data transmission, and the resource management unit retains or releases the scheduling request depending on the determined cell type.

2. The user equipment as claimed in claim 1, wherein the multiple base stations include a first base station and a second base station, and when the cell type determination unit determines that the cell providing the uplink dedicated radio resources is served by the second base station, the resource management unit retains the uplink dedicated radio resources, and when the cell type determination unit determines that the cell providing the uplink dedicated radio resources is served by the first base station, the resource management unit releases the uplink dedicated radio resources.

3. The user equipment as claimed in claim 2, wherein upon receiving an indication to release the uplink dedicated radio resources from the first base station or the second base station, the resource management unit releases the retained uplink dedicated radio resources.

4. The user equipment as claimed in claim 2, wherein if the uplink dedicated radio resources are retained, the resource management unit stops uplink transmission in the cell providing the uplink dedicated radio resources.

5. A method in a user equipment wherein radio resources are assigned from multiple base stations to the user equipment, comprising:
detecting occurrence of a release trigger for assigned uplink dedicated radio resources;
determining a type of a cell providing the uplink dedicated radio resources; and
retaining or releasing the uplink dedicated radio resources depending on the determined cell type,
wherein the release trigger for the uplink dedicated radio resources is an excess of retransmissions of a scheduling request for requesting an uplink grant of uplink data transmission, and the retaining or releasing the uplink dedicated radio resources comprises retaining or releasing the scheduling request depending on the determined cell type.

* * * * *